United States Patent
Purvis, II et al.

(10) Patent No.: US 6,345,775 B1
(45) Date of Patent: Feb. 12, 2002

(54) VERY HIGH SOLID CONTENT AEROSOL DELIVERY SYSTEM

(75) Inventors: Daniel Charles Purvis, II, Temple; Kenneth Charles Pechal, Rogers; John James Ach, Temple, all of TX (US)

(73) Assignee: Wilsoart International, Inc., Temple, TX (US)

( * ) Notice: Subject to any disclaimer, the term of this patent is extended or adjusted under 35 U.S.C. 154(b) by 0 days.

(21) Appl. No.: 09/583,793

(22) Filed: May 31, 2000

Related U.S. Application Data

(63) Continuation-in-part of application No. 09/316,339, filed on May 21, 1999, which is a continuation-in-part of application No. 09/126,383, filed on Jul. 30, 1998.

(51) Int. Cl.⁷ ................................................. B05B 7/32
(52) U.S. Cl. ............... 239/337; 239/333; 239/590; 239/597; 239/601; 524/270; 524/575
(58) Field of Search ................... 239/333, 337, 239/590, 597, 601; 524/270, 274, 575, 579, 834

(56) References Cited

U.S. PATENT DOCUMENTS

| | | |
|---|---|---|
| 2,734,774 A | 2/1956 | Manseau |
| 3,101,906 A | 8/1963 | Webber |
| 3,198,442 A | 8/1965 | Brenner |

(List continued on next page.)

FOREIGN PATENT DOCUMENTS

| | | | |
|---|---|---|---|
| CA | 2063862 | 3/2000 | |
| DE | 3028693 A1 | 2/1982 | |
| EP | 0814139 A1 | 12/1997 | .......... C09J/111/00 |
| EP | 1053791 A1 | 11/2000 | |
| FR | 2 002 620 | 10/1969 | |
| GB | 1047732 | 11/1966 | |
| GB | 2 003 160 A | 3/1979 | |
| GB | 1 211 662 | 11/1997 | |
| JP | 48-26378 | 8/1973 | |
| JP | 49-25032 | 3/1974 | |
| JP | 49-16104 | 4/1974 | |
| JP | 51007042 A | 1/1976 | |
| JP | 5230838 A | 8/1977 | |
| JP | 54-30232 | 3/1979 | |
| JP | 55-000724 | 1/1980 | |
| JP | 58-101173 | 6/1983 | |
| JP | 05-295336 | 11/1993 | |
| JP | 8134419 A | 5/1996 | |
| JP | 45-22239 | 7/1997 | |
| JP | 10-88091 | 4/1998 | |

OTHER PUBLICATIONS

"Innovation through Microfluidizer Technology," Microfluidics International Corporation, p. 1–8 (1995).

(List continued on next page.)

*Primary Examiner*—Kevin Shaver
*Assistant Examiner*—Robin O. Evans
(74) *Attorney, Agent, or Firm*—Baker Botts L.L.P.

(57) ABSTRACT

This invention concerns very high solid content aerosol adhesives and an aerosol spray device for the application of such aerosols comprising a spray can, a valve mounted to the can, a button mounted to the valve to control its opening and closing, a nozzle comprising a throughbore in fluid communication with the can interior when the valve is open. The nozzle comprises an axial throughbore, a flow restrictor being a channel having a length and a rectangularly-shaped cross section, and an exit port comprising a substantially rectangular orifice and a pair of opposing horizontal and a pair of opposing vertical walls extending and flaring outward from the orifice in the direction of the spray flow. This invention provides a very high solid content contact adhesive and an application device which provides for a substantially more uniform application of the adhesive than previously attainable.

20 Claims, 5 Drawing Sheets

U.S. PATENT DOCUMENTS

| | | | |
|---|---|---|---|
| 3,346,195 A | 10/1967 | Groth | |
| 3,361,693 A | 1/1968 | Geschwind | |
| 3,414,426 A | 12/1968 | Kleveland | |
| 3,595,821 A | 7/1971 | Spector et al. | |
| 3,754,710 A | 8/1973 | Chimura | |
| 3,806,028 A | 4/1974 | Coffey | |
| 3,951,722 A | 4/1976 | Howson et al. | |
| 3,965,061 A | 6/1976 | Bash et al. | |
| 3,970,502 A | 7/1976 | Turner | |
| 4,036,673 A | * 7/1977 | Murphy et al. | 156/71 |
| 4,037,016 A | * 7/1977 | Habeck et al. | 428/349 |
| 4,074,033 A | * 2/1978 | Wolinski et al. | 526/47 |
| 4,074,861 A | 2/1978 | Magers et al. | |
| 4,097,000 A | 6/1978 | Derr | |
| 4,401,271 A | * 8/1983 | Hansen | 239/337 |
| 4,401,272 A | * 8/1983 | Merton et al. | 239/337 |
| 4,404,243 A | 9/1983 | Terpay | |
| 4,477,613 A | 10/1984 | Evans et al. | |
| 4,485,200 A | 11/1984 | Perlinski et al. | |
| 4,532,273 A | 7/1985 | Kadowaki et al. | |
| 4,533,254 A | 8/1985 | Cook et al. | |
| 4,783,389 A | 11/1988 | Trout et al. | |
| 4,897,137 A | 1/1990 | Miller et al. | |
| 5,066,522 A | 11/1991 | Cole et al. | |
| 5,194,299 A | 3/1993 | Fry | |
| 5,213,739 A | 5/1993 | Dickerson et al. | |
| 5,314,097 A | 5/1994 | Smrt et al. | |
| 5,409,987 A | 4/1995 | Kalwara et al. | |
| 5,444,112 A | 8/1995 | Carnahan | |
| 5,450,983 A | 9/1995 | Stern et al. | |
| 5,464,154 A | 11/1995 | Nielsen | |
| 5,639,025 A | 6/1997 | Bush | |
| 5,715,975 A | 2/1998 | Stern et al. | |
| 5,733,961 A | 3/1998 | Purvis, II et al. | |

OTHER PUBLICATIONS

Japanese Abstract—JP7184611, Jul. 25, 1995.
Japanese Abstract—JP5262641, Oct. 12, 1993.
Japanese Abstract—JP 08 337765 A, Dec. 24, 1976.
Japanese Abstract—JP 10 204398 A, Apr. 08, 1998.
Japanese Abstract—JP 62 205177 A, Sep. 09, 1987.
Japanese Abstract—JP 07126593 A, May 16, 1995.
Japanese Abstract—JP 05295336 A, Nov. 09, 1993.
Japanese Abstract—JP 55000724 A, Jan. 07, 1980.
Japanese Abstract—JP 74016104 B, Apr. 19, 1970.
Japanese Abstract—JP 49025032 A, Mar. 06, 1974.
Handbook Of Adhesives, 1977, Nostrand Reinhold, New York, "Neoprene Adhesives: Solvent and Latex" Murray Steinfink, XP–0021211193 pp. 343–362.
Microfluidics Technical Bulletin 210EH–2, "M–210–EH Pilot Plant Production Microfluidizer," 4 pages.

* cited by examiner

VERY HIGH SOLID CONTENT AEROSOL DELIVERY SYSTEM

STATEMENT OF RELATED APPLICATIONS

This Application is a Continuation-in-Part of U.S. patent application Ser. No. 09/316,339, filed May 21, 1999 and a Continuation-in-Part of U.S. patent application Ser. No. 09/126,383, filed Jul. 30, 1998.

FIELD OF THE INVENTION

The present invention relates to aerosol adhesive application devices capable of spraying very high solid content aerosols, and, more particularly, very high solid content aerosol adhesives.

BACKGROUND OF THE INVENTION

In general, aerosol spray cans for a variety of aerosol products include a substance to be sprayed, an optional carrier fluid and a propellant. Typically, the propellant is a composition that pressurizes the can and assists in atomization of the substance being sprayed.

In the past chlorofluorcarbons (CFC's) were widely used as propellants but these propellants are now banned by international agreement. In response, industry has been seeking ways to reduce the amounts of organic solvents present in adhesive and other aerosol sprays.

A reduction in solvent would also produce other benefits. For Example, as the proportion of solvent present in aerosol adhesive decreases, more of the adhesive composition itself is present in the aerosol. This means fewer spray cans would be necessary to deliver the same amount of adhesive saving on cost and waste management.

Thus, for example, spray can-applied adhesive/solvent mixtures containing 20–25% by weight adhesive compound, also known as very high solid content (VHS) adhesives, have become increasingly desirable in the field of contact adhesives because of their use of smaller proportions of organic solvents. Our copending U.S. patent application Ser. No. 09/126,383, entitled "Very High Solids Adhesive" filed Jul. 30, 1998, which is hereby incorporated by reference, discloses such a composition for a VHS adhesive and a method for making the VHS adhesive. The adhesive typically comprises a resin/rubber/solvent mixture. The resins used typically include polyterpene resins, phenolic resins, phenolic modified terpene resins, aliphatic petroleum hydrocarbon resins, and the like. The rubbers used in the adhesive mixtures generally use a blend of polychloroprene synthetic rubbers. A wide range of solvents may be used depending on the composition of the adhesive with which it must be compatible to form a solution. Thus, the solvents used may include, among others, various chlorinated solvents, ketones, aliphatics, aromatics, alcohols, and esters, or even inorganic solvents such as water.

However, it has been found that in practice using VHS adhesives can be quite difficult. For example, in general, as the solid content of the adhesive increases, the viscosity of the adhesive/solvent mixture increases. When using standard nozzles and buttons on typical aerosol spray cans, the increased viscosity causes the spray pattern of adhesive mixture from the can to be uneven. For example, if a standard can, valve, and button (such as variable valve Model #V8-10-118, with a 906 collar and button Model #166-197-1620-white, both provided by Newman-Green of Addison, Ill.) are used to spray a VHS adhesive/solvent mixture having 30 wt % adhesive, such as neoprene, the spray tends to be uneven. That is, the spray pattern will have varying concentrations across the area of application. It is believed that this generally occurs because the button contains a substantially circular shaped exit port through which the VHS adhesive mixture stream passes so that there is limited or no "fanning" of the spray; the stream exits in a substantially straight line. Additionally, even if some outward "fanning" should occur, the fanning is not controlled and the concentration of the sprayed fluid is not uniform and tends to vary throughout the application area.

Various nozzles for attachment to the spray buttons have been designed to try to overcome the nonuniformity of spray problem. U.S. Pat. No. 4,401,272, issued to Merton et al., on Aug. 30, 1983, and U.S. Pat. No. 4,401,271, issued to Hansen, on Aug. 30, 1983, each disclose nozzles which attach to aerosol spray can buttons. These nozzles do not appear to resolve the issue. For example, the '272 patent discloses that the nozzle is only capable of spraying mixtures with solid content levels up to 11. 1%, well below typical VHS levels. When such nozzles are used, the spray tends to be more concentrated at the top and bottom of the spray area and less concentrated near the center of the spray area. The '271 patent provides another attempt at a solution to the "nonuniformity of spray" issue.

As explained above, there is a need for a VHS adhesive/solvent mixture with higher workable solids contents than heretofore known and a device for applying such a mixture substantially uniformly.

BRIEF SUMMARY OF THE INVENTION

The present invention relates to an aerosol spray device, comprising:

- a spray can;
- a valve mounted to the can;
- a button mounted to the valve to control opening and closing of the valve, the button having an exit port in fluid communication with an interior of the can when the valve is open; and
- a nozzle, mounted to the exit port of the button, said nozzle including a throughbore having a flow restrictor proximate to the throughbore's exit end and having a substantially rectangular exit port, the port having at least one pair of opposite walls flaring outward from the flow restrictor at an angle of about 20 to about 75°, wherein the spray can has an interior and the interior comprises:
  - (a) propellant; and
  - (b) an adhesive mixture comprising:
    - (a) 35 to 70% by weight solvent,
    - (b) 4 to 30 weight % resin, and
    - (c) 8 to 40 weight % rubber, based upon the weight of the adhesive mixture, wherein the adhesive mixture has a Brookfield viscosity of from about 50 to 600 cps, and a solids content of at least about 20%.

The present invention provides a very high solids application device which allows substantially more uniform application of the high solids fluid than was previously attainable. Additional aspects of the present invention will become evident upon reviewing the non-limiting embodiments described in the specification and the claims taken in conjunction with the accompanying figures, wherein like numerals designate like elements.

BRIEF DESCRIPTION OF THE DRAWINGS

FIG. 1 is a side view of a VHS adhesive spray can;

FIG. 2 is a top view of a VHS adhesive spay can;

FIG. 3 is a cross-sectional side view of an exemplary embodiment of a nozzle and button of the present invention;

DETAILED DESCRIPTION OF THE INVENTION

Figure 1:
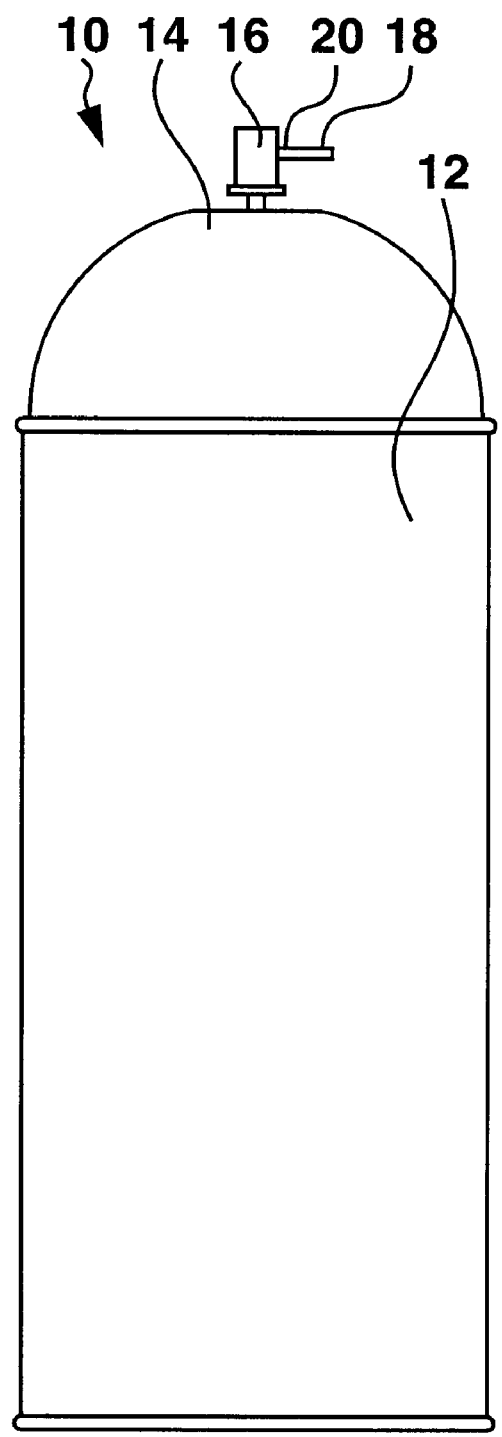

The following descriptions are of preferred embodiments, and are not intended to limit the scope, applicability, or configuration of the invention in any way. Rather, the following description provides a convenient illustration for implementing a preferred embodiment of the invention. Various changes may be made in the function and arrangement of elements described in the preferred embodiments without departing from the spirit and scope of the invention as set forth in the appended claims. In addition, while the following detailed description is generally described with respect to certain VHS adhesive mixtures, the invention is also applicable to other higher viscosity mixtures that are propelled or applied through an aerosol spray can. Moreover, the nozzles of the invention are not limited to those described specifically herein, but encompass those that are equivalent to the ones described.

In the specification and claims, the term VHS refers to "very high solids content". Generally in the art this refers to a mixture having about 25% or more solids content. While the following description relates mainly to VHS adhesives, it is clear that the principles discussed and devices described are also applicable to other VHS substances that are supplied and propelled through aerosol cans, for instance, paints, lacquers, polishes, waxes and the like.

In a preferred embodiment, the adhesive mixture to be sprayed according to the invention comprises a blend of one or more rubbers, one or more solvents and optionally one or more hydrocarbon resins. In some embodiments a rubber/solvent mixture can be used, however in other embodiments a rubber/solvent/resin combination is used. The adhesive mixture typically comprises:

(a) 35 to 70 weight % solvent, preferably 40 to 65 weight %, preferably 45 to 60 weight %, and (b) 8 to 40 weight percent rubber, preferably 10 to 36 weight %, preferably 15 to 30 weight %, and optionally (c) 4 to 30 weight % resin, preferably 6 to 28 weight %, preferably 8 to 26 weight %, based upon the weight of the solvent, rubber and optional resin.

Generally the adhesive mixture is then combined with a propellant and then placed in an aerosol delivery device.

The adhesive mixtures of the present invention preferably also have a low viscosity. In general, as the solids content of a mixture increases, generally so does the viscosity of the mixture, but the "shearing" mixing method of our prior application, described below, minimizes viscosity increase with increase in adhesive content. Thus, in a preferred embodiment, the adhesive mixtures described herein also have a viscosity that is in the range of at least about 50 cps, preferably about 200 to about 600, preferably from 250 to 400 cps. For purposes of this invention, viscosity is measured according to ASTM D 1084 (Brookfield viscosity, using spindle #4, 60 rpm and a temperature of 72° F., (22° C.)).

Preferred rubbers that may be used in the adhesive mixtures of this invention include known rubbers having a Mooney viscosity of about 30 to about 110 as measured by ASTM D 1646 (ML1+4 at 100° C.): In another preferred embodiment the rubbers preferably have high mechanical strength and quick green strength.

Typical rubbers include those rubbers known as polyisobutylene, (PIB or natural rubber), polyisoprene rubber, butyl rubber, polychloroprene rubber (Neoprene or CR), styrene butadiene rubber (SBR) (both the block and random forms), styrene isoprene styrene rubber (SIS)(both the block and random forms), nitrile rubber (NBR) and the like. A preferred polychloroprene rubber is a copolymer of chloroprene and 2,3 dichloro-1,3 butadiene. The rubbers may be modified with functional groups such as acids, esters, anhydrides, alcohol, acrylate, metal containing groups or the like. For example, a rubber, such as neoprene rubber or nitrile rubber, that has been grafted or otherwise modified with an acid or anhydride, such as maleic acid or maleic anhydride, may be used in the practice of this invention. In preferred embodiments, two or more of the rubbers are combined together before, during or after being combined with the other components of the adhesive mixture. In some embodiments, multiple rubbers that are variants (for example, two neoprene rubbers, where the first neoprene has a different comonomer from the second neoprene rubber), are combined together before, during or after being combined with the solvent and optional resin. A non-limiting example would be compounding a first polychloroprene rubber having a comonomer of 2,3 dichloro-1,3 butadiene with a second polychloroprene rubber having comonomer of sulfur or methacrylic acid, and thereafter combining the two compounded rubbers with the solvent and optional resin in the shear mixing operation discussed below. As an additional option one could then add a third similar or different rubber (such as another polychloroprene) during the shear mixing.

In one preferred embodiment the rubber comprises one or more neoprene rubbers and the rubber is present at 10 to 35 weight %, preferably 15 to 35 weight %, even more preferably at 19–30 weight % based upon the weight of the adhesive mixture.

Preferred solvents for use in the adhesive mixture include any halogenated solvents, such as chlorinated solvents, ketones, aliphatics, aromatics, alcohols, esters, water, and mixtures thereof. In a preferred embodiment the solvent comprises one or more of acetone, toluene, cyclohexane, hexane, pentane, di-methyl ether and the like. In a particularly preferred embodiment the solvent comprises a mixture of acetone, toluene cyclohexane, hexane, pentane and dimethyl ether.

Preferred resins for use in the adhesive mixture include any natural or synthetic resin, petroleum resins, polar or non-polar hydrocarbon resin, polyterpenes, phenolic resins, phenolic modified terpene resins, aliphatic aromatic hydrocarbon resins, and aliphatic petroleum hydrocarbon resins, and the like. Preferred resins have a ring and ball softening point of about 25° C. to about 180° C., preferably 25 to 135° C., preferably 50 to about 135° C., as measured according to ASTM E-28.

The adhesive mixture may also comprise optional additives known in the art. Preferred additives include, antioxidants, UV stabilizers, colorants, dyes, pigments, fillers, lubricants, plasticizers, cure agents, cross-linking agents, and surfactants. Preferred examples include metal oxides, such as magnesium oxide and/or zinc oxide. Without wishing to be bound by any theory it is believed that the metal oxides aid in stabilization by neutralizing hydrochloric acid that is released as polychloroprene ages and may also aid in increasing tensile strength by acting as a curing/crosslinking agent. In a preferred embodiment the additives are present in amount from 0.5 weight % to 5 weight %, preferably from about 1 to about 4 weight %, more preferably from about 1.5 to 3 weight %, based upon the weight of the total adhesive mixture. Preferred antioxidants include phenols, phosphites, thioesters, amines, polymeric hindered phenols, copolymers of 4-erthyl phenols, reaction product of dicyclopentadiene and butylene and mixtures thereof. Preferred antioxidants include phenyl-alpha-naphthylamine, phenyl-beta-naphthylamine, phenyl-beta-naphthylene, 2,2'-methylene bis (4-methyl-6-tertiary butyl phenol), Irganox™ 1010 (available from Ciba Geigy) and the like.

The adhesive mixtures described above may be formed using any one of many useful processes, including for example the shearing mixing process disclosed in U.S. Pat. No. 5,733,961 to Purvis II, et al., issued Mar. 31, 1998, which is hereby incorporated by reference. The shearing is generally done using a Microfluidizer® processor (made by Microfluidics International Corp. of Newton, Mass.) utilizing an electrically driven, dual plunger or piston, hydraulic Intensifier pump which pressurizes the fluid product or similar device. The rubber and solvent are mixed in a kettle process and the Microfluidizer® suitably moves a stream of the mixture at extremely large pressures and speeds. The stream is then suitably split in two parts, its direction changed and cause to collide with itself in rapid succession. The process creates shearing, impact and cavitation effects within the mixture. These effects dramatically reduce the size of particles within the mixture, thereby lowering the viscosity of the mixture and enabling additional rubber to be introduced to the mixture. Accordingly, the weight percentage of the rubber/solvent/optional resin mixture may be increased into even higher solid content ranges than previously thought possible without unduly increasing the viscosity of the mixture. Multiple rubbers may be introduced into the mixing method described herein. The multiple rubbers introduced into this shearing mixture may be the same or different. Resin and other additives may also be introduced into the shear mixing at any point in the process. Preferably, the resin and/or additives such as stabilizers, surfactants, anti-oxidants and the like, are introduced towards the end of the mixing process.

Once the rubber/solvent and optional resin are mixed to form the adhesive mixture, the solids content of the adhesive mixture is preferably 20 weight % or more, preferably 28 weight % or more even more preferably from 20 to 55 weight %, more preferably from 30 to 55 weight %, based upon the weight of the adhesive mixture. Solids content is measured by heating a 1 gram sample of the adhesive at 250° F. (121° C.) for 10 minutes. After the 10 minutes remove the sample from the heat and let cool for 2 minutes. Weigh the sample. Multiply the weight in grams by 100 to get the percent solids. For example if the sample weight is 0.5 grams after heating and cooling, 0.5×100 equals 50. Therefore the sample had 50% solids.

The adhesive mixture is then preferably combined with propellant and placed in pressurized delivery container, such as an aerosol can. The solids content of the adhesive mixture and the propellant in the containers is preferably 5 to 35 weight %, preferably 10 to 30 weight %, more preferably 15–25 weight % based upon the weight of the container's contents. Preferred propellants include dimethyl ether, $C_1$ to $C_4$ alkanes (such as propane, isobutane, butane, cyclobutane, and the like), any inert gases (such as nitrogen), carbon dioxide, air, refrigerants (such as 134a, 134b, 152a, available for Dupont Chemical or Allied Signal), hydrochlorofluorocarbons, hydrofluorocarbons and the like. In a preferred embodiment the propellant is a mixture of two or more of the above.

Figure 2:
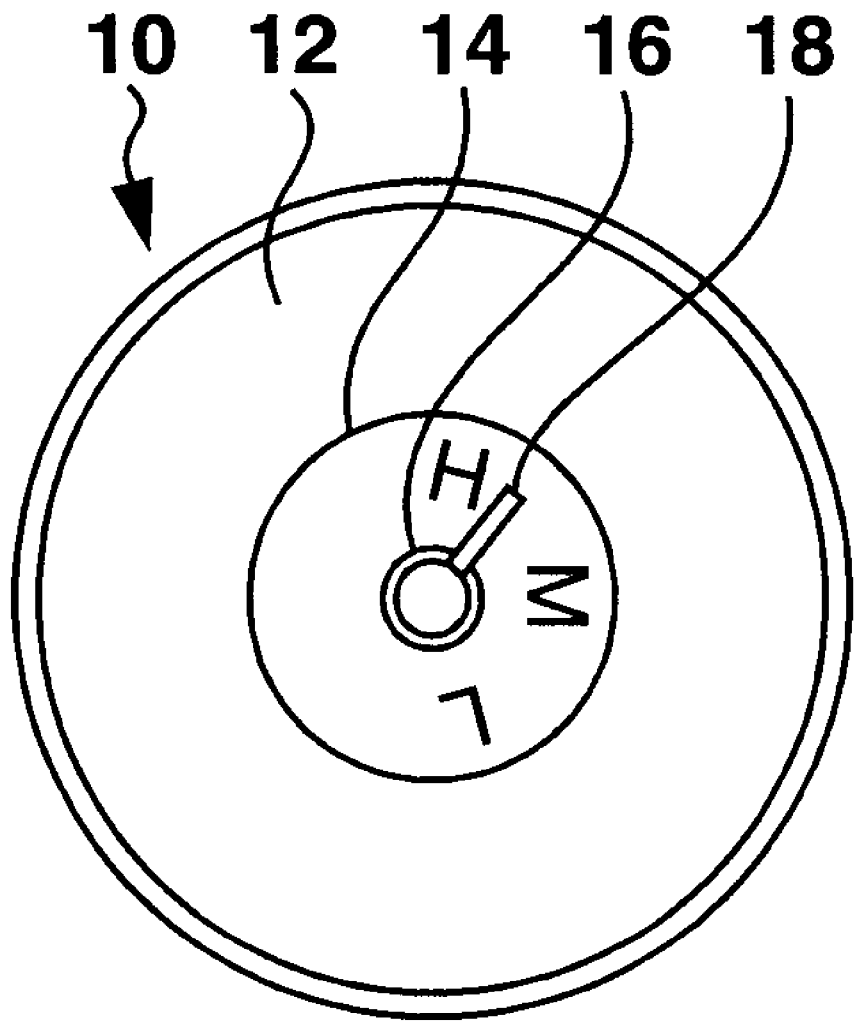

A particularly preferred delivery system for spraying the adhesive mixture utilizes an aerosol can, and includes the use of a propellant. With reference to FIGS. 1 and 2, in accordance with a preferred embodiment of the present invention, spray device 10 is capable of substantially uniformly applying a coating of the adhesive mixture to a substrate. In the present embodiment, spray device 10 is an aerosol spray can comprised of a can 12, a valve 14 at an upper end of can 12, a button 16 mounted to valve 14 to open the valve, and a nozzle 18 fitted to the button, as explained below. Can 12 is generally any suitable pressurizable aerosol spray can capable of containing the VHS, solvent and propellant mixture. Valve 14 may suitably be any conventional aerosol spray can valve, though, in accordance with the present preferred embodiment, valve 14 may be selected from variable valve Model #V8-10-118 and equivalent valves, with a 906 or equivalent collar both provided by Newman-Green of Addison, Ill. Variable valve 14 allows the adjustment of the flow rate through valve 14, button 16 and nozzle 18 by rotation of button 16 around can 12. In the present preferred embodiment valve 14 suitably contains markings designating "low", "medium" and "high" rates of flow which aid in the determination of the flow rate through valve 14. Button 16 is any suitable conventional aerosol spray can button, and, in accordance with the present exemplary embodiment may be selected from Model #166-197-1620-white button, also provided by Newman-Green, and its equivalents.

Figure 3:
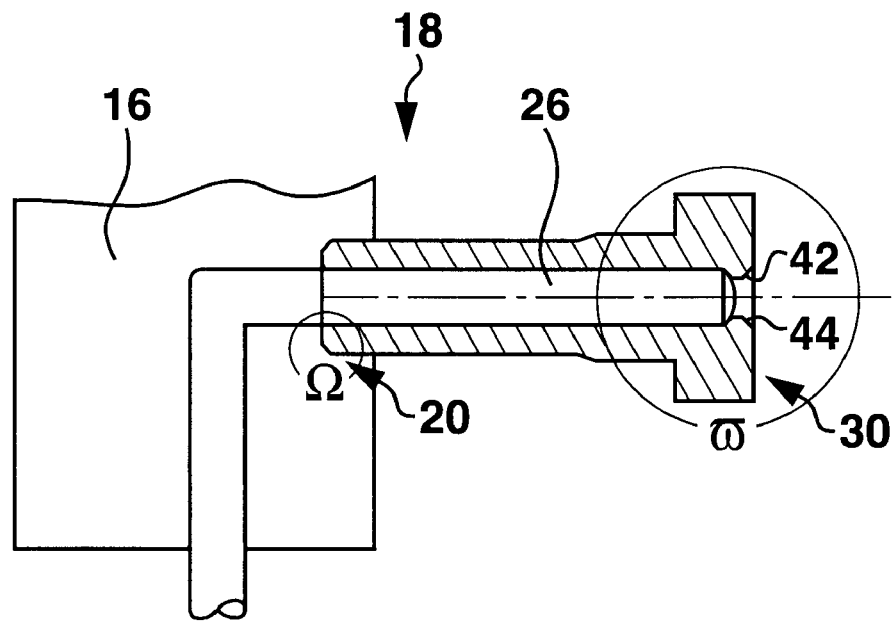
Figure 4:
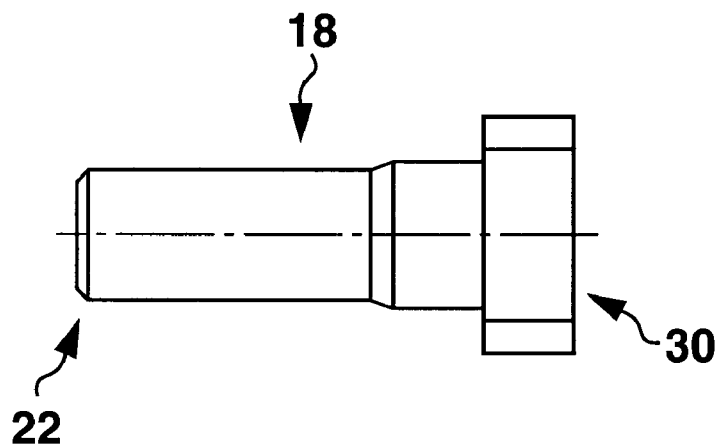
FIG. 4 is a side view of an exemplary embodiment of a nozzle of the present invention.
Figure 5:
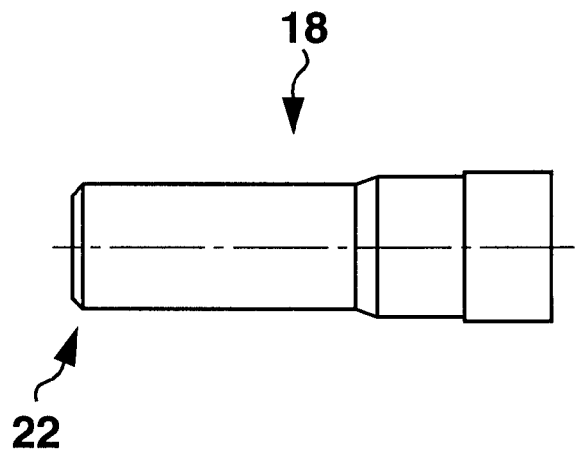
FIG. 5 is a top view of the present invention.

With reference now to FIGS. 3–5, the illustrated embodiment of the nozzle 18 of the invention is configured as an elongated body member formed from any material resistant to any corrosive or other deleterious effects of the adhesive mixture and should itself not contaminate the fluid being sprayed. For example, inert plastic, metals and the like.

Figure 6:
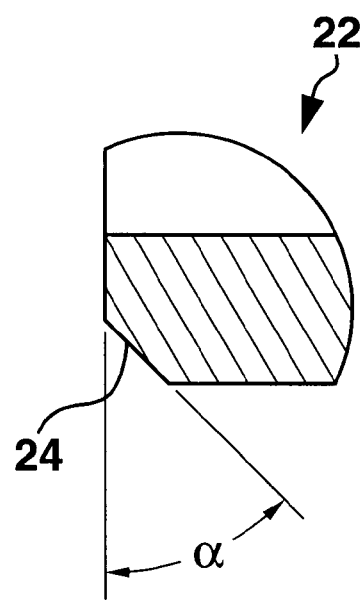
FIG. 6 is a close-up cross-sectional side view of a chamfered insertion end of the nozzle of the present invention.

In accordance with the present preferred embodiment of the present invention, nozzle 18 is adapted for use with button 16. For example, according to one aspect of the present exemplary embodiment, the substantially cylindrical or tapered shape of nozzle 18 has an insertion end 22 and an adhesive spray exit end 30. In the present embodiment, nozzle 18 has a diameter of approximately 0.120 in. (3.05 mm) Insertion end 22 is suitably sized for mounting to a button exit port 20 for fluid communication between the port and the throughbore 26 of the nozzle 18 when valve 14 is open. In accordance with the illustrated embodiment, nozzle 18 is either releasably or permanently press fit into button exit 20 of button 16. However, alternatively, insertion end 22 may be mounted to button exit port 20 by other means, including helical threading, adhesives and the like. Also, the nozzle 18 may be integrally formed on button 16 to produce a one-piece button with nozzle 18. Additionally, with momentary reference to FIG. 6, insertion end 22 may optionally include a chamfer 24 formed by an angle a in order to facilitate the mounting of insertion end 22 to exit port 20 of button 16. For example in the present exemplary embodiment, chamfer 24 is about 0.0125 in. (0.32 mm) deep and angle a is about 45°.

Figure 7:
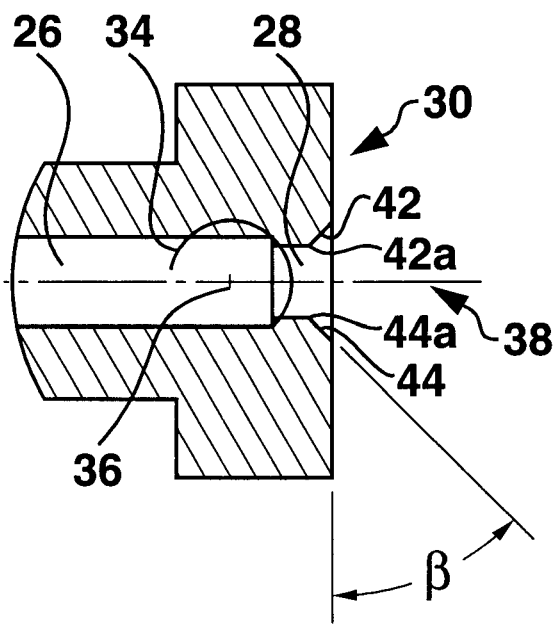
FIG. 7 is a cross-sectional close-up view of the exit end of the nozzle.

In accordance with another aspect of the present invention, and with reference now to FIG. 7, nozzle 18 is suitably configured with all axial throughbore or cannula 26 extending lengthwise therethrough. Throughbore 26 is of substantially uniform diameter along a major portion of its length but has a flow restrictor 28 near its exit end 30. The restrictor 28 results in a reduction in cross sectional area for fluid flow through nozzle 18, causing a decrease in fluid pressure in restriction 28. In accordance with the present exemplary embodiment, the ratio of the cross-sectional area for fluid flow of throughbore 26 to the cross-sectional fluid flow area of restrictor 28 is preferably about 2 to about 6, more preferably 4 to 6, even more preferably 4 to 5. In a particularly preferred embodiment the ratio is about 4.7.

Beyond restrictor 28 the tip of nozzle 18 assumes a substantially rectangular shaped exit port and has at least one pair of opposed sidewalls that flare outwardly towards the exit end 30 as described below.

In accordance with various aspects of the present invention, the diameters (or cross-sectional area for fluid flow) of the major throughbore portion 26 and restrictor 28 suitably vary depending on factors such as the solid content of the adhesive mixture passing through nozzle 18, the viscosity of the adhesive mixture, the intended concentration of the sprayed adhesive, and the desired spray pattern. In the present exemplary embodiment, the major throughbore portion 26 suitably has a diameter of about 0.062 in. (1.57 mm) and flow restrictor 28 has a substantially rectangular shape with a long side 46 and a short side 48. In the present exemplary embodiment, long side 46 is preferably about 0.040 in. (1.02 mm) and short side 48 is preferably about 0.016 in. (0.41 mm).

Additionally, in accordance with the present exemplary embodiment, as the viscosity of the adhesive mixture decreases, the cross-sectional area of restrictor 28 also may be decreased, while, as the viscosity of the adhesive mixture increases, the crosssectional area of restrictor 28 desirably increases. For example, if the viscosity of the adhesive mixture decreases to 50 cps, the cross-sectional area for fluid flow of restrictor 28 may be decreased about 20% relative to the area based on the preferred dimensions described above. On the other hand, if the viscosity of the adhesive mixture increases to 400 cps, the cross-sectional area for fluid flow of restrictor 28 may be up to about 30% larger than the area based on the above described dimensions.

According to another aspect of the present exemplary embodiment, to facilitate fluid flow and maintain a uniform flow pattern, throughbore portion 26 preferably transitions gradually to the narrower throat of restrictor 28. This may be achieved by curving the terminal end of major portion 26 uniformly inward in a radius of curvature 34 to form the walls of the preferred substantially rectangular exit port. The radius is about 0.0302 in. (0.77 mm) with a center 36 that is located 0.0503 in. (1.28 mm) from exit end 30, along a centerline 38 of throughbore 26. Preferably the radius is from 0.28 inches (0.7 cm) to about 0.032 inches (0.08 cm). Preferably the center is located at from 0.048 inches (0.12 cm) to about 0.053 inches (0.14 cm) from the exit end.

Figure 8:
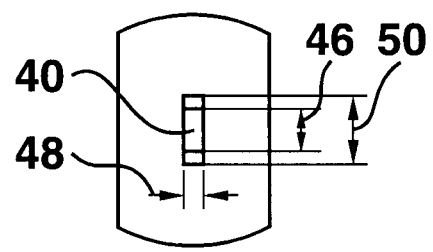
FIG. 8 is a front view of the exit end of the nozzle.

In accordance with another aspect of the present exemplary embodiment, and with reference to FIG. 8, an exit port 40 is suitably provided at exit end 30 of nozzle 18. Exit port 40 is suitably formed in a shape designed to facilitate spreading of the aerosol spray exiting therethrough into a fan shape. The preferred exit port, as described above, is of a substantially rectangular shape, with vertical opposed sides longer than horizontal sides. Exit port 40 is suitably formed with an outward flare from the restrictor 28 that has at least one pair of opposing sidewalls that form the upper and lower walls 42, 44 of the rectangular shaped port 40 that facilitate shaping of the spray. Sidewalls 42a, 44a flare outward at an angle β which suitably widens from starting points 42a. 44a on restrictor 28 to the nozzle face or tip to direct the spray.

The angle β is preferably 20° to 75°, more preferably 30 to 55°, more preferably 40 to 50°.

In the embodiment shown, for an adhesive mixture of viscosity about 200 cps, an Angle β of about 20° to 75° is operable, and about 45° is preferred, while the length of a flare exit long side 50 is about 0.0471 to 0.1125 in. (1.20 to 2.86 mm), and preferably about 0.0663 in. (1.68 mm). In a preferred embodiment the flare angle may vary by ±0.003 inches (0.008 cm). When the viscosity is greater or smaller, experimental testing of β angles will lead to selection of an optimum flare angle.

The invention described herein is useful for applying the adhesive mixture to wood, laminates, paper, glass, carbon filter, concrete, ceramics, metals, steel, cloth, composites, plastics, vinyl, rubbers, cardboard, particle board, plywood, fiberboard (such as medium density fiberboard) and the like.

Thus, while the principles of the invention have been described in illustrative embodiments, many combinations and modifications of the above-described structures, arrangements, proportions, the elements, materials and components, used in the practice of the invention in addition to those not specifically described may be varied and particularly adapted for a specific environment and operating requirement without departing from those principles.

All documents described herein are incorporated by reference herein, including any priority documents, parent applications and/or testing procedures.

What is claimed is:

1. An aerosol spray device, comprising:
   (a) a spray can, wherein the spray can has an interior comprising:
      (i) propellant; and
      (ii) an adhesive mixture comprising:
         (a) 35 to 70% by weight solvent;
         (b) 4 to 30 weight % resin; and
         (c) 8 to 40 weight % rubber, based upon the weight of the adhesive mixture, wherein the adhesive mixture has a Brookfield viscosity of from about 50 to 600 cps, and a solids content of at least 20%;
   (b) a valve mounted to the can;
   (c) a button mounted to the valve to control opening and closing of the valve, the button having an exit port in fluid communication with an interior of the can when the valve is open; and
   (d) a nozzle coupled to the exit port of the button, the nozzle comprising:
      (i) an elongate body;
      (ii) an axial throughbore extending through said elongate body and coupled with a flow restrictor;
      (iii) the flow restrictor being a channel having a length and a rectangularly-shaped cross section, and further coupled to an exit port;
      (iv) the exit port comprising a substantially rectangular orifice and further comprising a pair of horizontal opposing walls and a pair of vertical opposing walls, wherein at least one of said pair of walls flares outward from the orifice to a nozzle exit end.

2. The aerosol spray device of claim 1 wherein at least one of said pair of opposing walls flares outward at an angle of about 20° to about 75°.

3. The aerosol spray device of claim 1 wherein the walls flare outward at an angle of 30 to 55°.

4. The aerosol spray device of claim 1 wherein the walls flare outward at an angle of 40 to 50°.

5. The aerosol spray device of claim 1 wherein a ratio of a cross-sectional area of said throughbore to a cross-sectional area of said restrictor is about 2 to about 6.

6. The aerosol spray device of claim 1, wherein the adhesive mixture has a Brookfield viscosity of about 50 to 400 cps.

7. The aerosol spray device of claim 1, wherein the adhesive mixture has a Brookfield viscosity of about 200 to 400 cps.

8. The aerosol spray device of claim 1, wherein the resin has a ring and ball softening point of about 25° C. to about 180° C.

9. The aerosol spray device of claim 1 wherein the resin comprises natural or synthetic resin, petroleum resins, polar or non-polar hydrocarbon resin, polyterpenes, phenolic resins, phenolic modified terpene resins, aliphatic aromatic hydrocarbon resins, and/or aliphatic petroleum hydrocarbon resins.

10. The aerosol spray device of claim 1 wherein the solvent comprises one or more of halogenated solvents, ketones, aliphatics, aromatics, alcohols, esters, or water.

11. The aerosol spray device of claim 1 wherein the rubber has a Mooney viscosity of 30–110.

12. The aerosol spray device of claim 1 wherein the rubber comprises one or more of polyisobutylene rubber, butyl rubber, polyisoprene rubber, polychloroprene rubber, styrene butadiene rubber, styrene isoprene styrene rubber, or nitrile rubber.

13. The aerosol spray device of claim 1 wherein the resin is present at 6 to 28 weight % and has a Ring and Ball softening point of 25 to 135° C., the solvent comprises one or more of acetone, toluene, cyclohexane, hexane, pentane, and di-methyl ether and is present at 40 to 65 weight %, the rubber comprises polychloroprene and is present at 10 to 36 weight %, and the adhesive mixture has a solids content of 30 to 55 weight % and a Brookfield viscosity of about 200 to about 400 cps.

14. The aerosol spray device of claim 1 wherein the adhesive mixture further comprises about 0.5 to about 5.0 weight % of one or more metallic oxides, based upon the weight of the adhesive mixture.

15. The aerosol spray device of claim 1 wherein the adhesive mixture has a solids content of 28 to 55 weight %.

16. The aerosol device of claim 1 wherein the propellant comprises one or more of nitrogen, carbon dioxide, air, refrigerant, hydrofluorocarbon, hydrochlorofluorocarbon, dimethyl ether, propane, isobutane, butane, and cyclobutane.

17. The aerosol device of claim 1 wherein the solids content of the combination of the propellant and the adhesive mixture is 5 to 35 weight %, based upon the weight of the aerosol device's contents.

18. The aerosol device of claim 1 wherein the rubber comprises one or more neoprene rubbers and is present at about 19–30 weight %.

19. The aerosol device of claim 1 wherein the adhesive mixture further comprises one or more additives selected from the group consisting of antioxidants, UV stabilizers, colorants, dyes, pigments, fillers, lubricants, plasticizers, cure agents, cross-linking agents, and surfactants.

20. The aerosol device of claim 1 wherein:

(a) at least one of said pair of walls flares outward from the orifice at an angle of 40° to 50°;

(b) a ratio of a cross-sectional area of said throughbore to a cross-sectional area of said flow restrictor is about 4 to about 5;

(c) the adhesive mixture has a Brookfield viscosity of about 250 to 400 cps and a solids content of 30 to 55 weight %;

(d) the resin is present at 8 to 26 weight %, has a ring and ball softening point of about 25° C. to about 180° C. and comprises natural or synthetic resin, petroleum resins, polar or non-polar hydrocarbon resin, polyterpenes, phenolic resins, phenolic modified terpene resins, aliphatic aromatic hydrocarbon resins, and/or aliphatic petroleum hydrocarbon resins;

(e) the solvent is present at 45–60 weight % and comprises one or more of halogenated solvents, ketones, aliphatics, aromatics, alcohols, esters, or water;

(f) the rubber is present at 15 to 30 weight %, has a Mooney Viscosity of 30–110 and comprises one or more of polyisobutylene rubber, butyl rubber, polyisoprene rubber, polychloroprene rubber, styrene butadiene rubber, styrene isoprene styrene rubber, or nitrile rubber;

(g) the adhesive mixture further comprises about 1.5 to about 3.0 weight % of metallic oxide, based upon the weight of the adhesive mixture, (h) the propellant comprises one or more of nitrogen, carbon dioxide, air, refrigerant, hydrofluorocarbon, hydrochlorofluorocarbon, dimethyl ether, propane, isobutane, butane, and cyclobutane; and (i) the solids conent of the combination of the propellant and the adhesive mixture is 5 to 35 weight % based upon the weight of the aerosol device's contents.

* * * * *

UNITED STATES PATENT AND TRADEMARK OFFICE
CERTIFICATE OF CORRECTION

PATENT NO. : 6,345,775 B1
DATED : February 12, 2002
INVENTOR(S) : Daniel Charles Purvis, II, Kenneth Charles Pechal and John James Ach It is certified that error appears in the above-identified patent and that said Letters Patent is hereby corrected as shown below:

<u>Title page,</u>
Item [73], Assignee: Wilsonart International, Inc.

Signed and Sealed this

Twentieth Day of August, 2002

Attest:

JAMES E. ROGAN
Attesting Officer   Director of the United States Patent and Trademark Office